(12) United States Patent
Pratte

(10) Patent No.: US 7,138,271 B2
(45) Date of Patent: Nov. 21, 2006

(54) CONTINUOUS COMPOSTER

(75) Inventor: Jean-Pierre Pratte, Tring-Jonction (CA)

(73) Assignee: 9087-7374 Quebec Inc., Tring-Jonction (CA)

( * ) Notice: Subject to any disclaimer, the term of this patent is extended or adjusted under 35 U.S.C. 154(b) by 442 days.

(21) Appl. No.: 10/617,858

(22) Filed: Jul. 14, 2003

(65) Prior Publication Data

US 2004/0147013 A1    Jul. 29, 2004

(51) Int. Cl.
*C12M 1/02*    (2006.01)

(52) U.S. Cl. .............................. 435/290.2; 435/290.3; 435/290.4

(58) Field of Classification Search ...................... None
See application file for complete search history.

(56) References Cited

U.S. PATENT DOCUMENTS

| | | | |
|---|---|---|---|
| 3,676,074 A | 7/1972 | Daigoro Shibayama et al. | |
| 3,837,810 A | 9/1974 | Richards et al. | |
| 3,845,939 A | 11/1974 | Waldenville | |
| 4,072,494 A | 2/1978 | Gujer | |
| 4,204,959 A | 5/1980 | Kreuzburg et al. | |
| 5,322,792 A | * 6/1994 | Peguy | 435/290.3 |
| 5,591,635 A | 1/1997 | Young et al. | |
| 5,776,768 A | 7/1998 | Seymour et al. | |
| 5,875,979 A | 3/1999 | Walters et al. | |
| 5,890,664 A | 4/1999 | Conant, III | |
| 5,981,270 A | 11/1999 | Roberts et al. | |

* cited by examiner

*Primary Examiner*—David Redding
(74) *Attorney, Agent, or Firm*—Protections Equinox Int'l; Franz Bonsang, Patent Agent

(57) ABSTRACT

A continuous composter for continuously processing organic waste material from a generally heterogeneous state into a generally homogenous state. The composter includes a container rotatably mounted on a support frame about its longitudinal axis that defines an inner chamber containing an amount of the heterogeneous waste material for continuous circulation therein. An agitator located within the inner chamber is rotatably mounted on fixed end walls about its own longitudinal axis that is offset relative to the container axis. The agitator is located to selectively receive the circulated waste material from the rotating container, to separate the heterogeneous waste material into the homogenous waste material, and to aerate the homogenous waste material by projecting it within the chamber. Both the container and the agitator rotates in a same direction at a relatively slow and fast rotational speed respectively.

45 Claims, 5 Drawing Sheets

CONTINUOUS COMPOSTER

FIELD OF THE INVENTION

The present invention relates to the field of composting apparatuses and methods and is more particularly concerned with an apparatus for continuous and rapid composting and its corresponding method.

BACKGROUND OF THE INVENTION

It is well known in the art to use elongated containers to process any type of organic waste material such as sewage sludge, animal excrements, leachate and the like into usable humus fertilizer, compost or the like material depending on the material and the specific needs.

Some of these prior art apparatuses and methods are disclosed in the following documents:

U.S. Pat. No. 3,676,074, issued Jul. 11, 1972, to Daigoro Shibayama et al. for "Apparatus for treating organic waste";

U.S. Pat. No. 3,837,810, issued Sep. 24, 1974, to Richards et al. for "Composter";

U.S. Pat. No. 3,845,939, issued Nov. 5, 1974, to Waldenville for "Composting apparatus";

U.S. Pat. No. 4,072,494, issued Feb. 7, 1978, to Gujer for "Method and device for the wet composting of organic sludge";

U.S. Pat. No. 4,204,959 issued May 27, 1980, to Kreuzburg et al. for "Apparatus for the treatment and composting of biological waste";

U.S. Pat. No. 5,591,635, issued Jan. 7, 1997, to Young et al. for "Methods and apparatuses for rapid composting with closed air loop circulation for positive control";

U.S. Pat. No. 5,776,768, issued Jul. 7, 1998, to Seymour et al. for "Cold weather composting apparatus";

U.S. Pat. No. 5,875,979, issued Mar. 2, 1999, to Walters et al. for "Green waste processor";

U.S. Pat. No. 5,890,664, issued Apr. 6, 1999, to Conant, III for "Transportable, self-contained, fully automated composter"; and U.S. Pat. No. 5,981,270, issued Nov. 9, 1999, to Roberts et al. for "Bio-catalytic oxidation reactor".

In order to increase the process speed, many apparatuses circulate and mix air into the waste material while either the outer shell or an inner agitator-like component rotates to enable the mixing and the homogenization process of the waste material therein.

Some other apparatuses include a rather complex control system of air circulating within the compost chamber to control the air temperature, humidity, pressure, oxygen level, carbon dioxide level, etc., so as to improve the processing of the waste material and maintain a proper temperature thereof.

In some prior art apparatuses, including U.S. Pat. Nos. 3,676,074; 3,837,810 & 5,591,635, the air inlets are located at the bottom of the container or within the amount of waste material to mix directly the air into the slurry of waste material. In other prior art apparatuses, including U.S. Pat. Nos. 3,676,074 & 5,981,270, the air inlets are located at the upper part of the container where the air volume mixes with the waste material at the interface there between; the upper surface of the waste material continuously changing with the tumbling due to the rotation of the container.

Another drawback of the prior art apparatuses is that they do not ensure that all of the waste material gets regularly properly mixed with air to better homogenize the waste material for an efficient processing, especially during a continuous processing as opposed to a batch processing.

Furthermore, in some prior apparatuses, the internal agitator dips into the waste material, thereby requiring a significant amount of power to ensure its rotation.

Accordingly, there is a need for an improved composter with a simple configuration.

SUMMARY OF THE INVENTION

It is therefore a general object of the present invention to provide an improved composter.

An advantage of the present invention is that the composter can continuously process waste material, in any environmental condition such as hot summer days and cold winter days.

Another advantage of the present invention is that the composter can perform rapid composting by providing process waste material with a few-hour or a few-day processing cycle.

A further advantage of the present invention is that the composter can be easily adapted depending on the type of waste material being processed and/or the required type of compost material.

Still another advantage of the present invention is that the composter ensures that substantially all of the waste material is regularly mixed with air for uniform processing and better homogenization.

Another advantage of the present invention is that the composter can be manufactured and sized according to the volume of waste material to be processed.

Yet another advantage of the present invention is that the composter has an agitator that lies substantially above the level of waste material inside the container to ensure a relatively easy rotation thereof, with as less power as possible.

Still a further advantage of the present invention is that the composter operates substantially without any operator(s), the waste material being automatically fed into, processed and discharged from the apparatus without the need of any operator. Some measurement instruments, under manual or computer control, are located at different locations on the composter to help setting up the latter at the early stage of the processing and to ensure proper autonomous functioning of the apparatus.

According to a first aspect of the present invention, there is provided a continuous composter for continuously processing organic waste material, the waste material being processed from a generally heterogeneous state into a generally homogenous state, the composter comprises: a support frame; a container defining a first longitudinal axis and having a sidewall, the container rotatably mounting on the support frame about the first axis, the sidewall defining an inner chamber having located therein an amount of the heterogeneous waste material for circulation thereof; an agitator defining a second longitudinal axis thereof, the agitator rotatably mounting within the inner chamber about the second axis, the second axis being substantially parallel to and in a spaced apart relationship relative to the first axis; the agitator being located to selectively receive an amount of the circulated waste material from the rotating container, to separate the heterogeneous waste material into the homogenous waste material, and to aerate the homogenous waste material with air contained within the inner chamber.

Typically, the container defines generally opposed longitudinal container ends thereof, the composter further including generally opposed feeder and collector walls secured to the support frame adjacent a respective of the container ends, the feeder and collector walls rotatably supporting the agitator.

Typically, the composter further includes: feeding means connectable to the feeder wall for continuously feeding the waste material therethrough into the inner chamber; collecting means connectable to the collector wall for continuously collecting the processed waste material therethrough from the inner chamber. Typically, both the container and the agitator are generally cylindrical in shape.

In one embodiment, the container and the agitator rotate with first and second rotational speeds respectively, the second rotational speed being larger than the first rotational speed. Typically, the second rotational speed is at least two orders of magnitude larger than the first rotational speed. The container and the agitator rotate are commonly rotatable relative to each other about the first and second axes respectively.

In one embodiment, the container includes longitudinal ribs extending inwardly from the sidewall. Typically, the ribs are generally equally circumferentially spaced apart from one another about the first axis.

Typically, the ribs extend substantially radially from the sidewall.

In one embodiment, each of the ribs is generally radially shaped so as to form a scoop to circulate the heterogeneous waste material therein. The scoop includes a first segment extending generally radially from the sidewall and a second segment extending inwardly and generally angularly from the first segment relative to a radial direction.

Typically, the ribs extend generally between the first and second end walls. The ribs extend generally axially between the first and second end walls.

Alternatively, each of the ribs selectively extends generally axially along a longitudinal portion of the sidewall.

In one embodiment, the ribs extend generally helically between the first and second end walls about the first axis.

In one embodiment, the composter further includes an air circulation means for allowing air to get within the inner chamber.

In one embodiment, the container has generally opposed first and second longitudinal end walls, the agitator extending generally between the first and second end walls.

Typically, the agitator has an outer peripheral wall for selectively receiving an amount of the circulated waste material from the rotating container and separating the waste material into the homogenous waste material.

Typically, the agitator includes protrusions extending outwardly from the outer peripheral wall. Typically, the protrusions extend substantially radially from the outer peripheral wall.

Typically, the protrusions are generally helically positioned on the peripheral wall about the second axis.

In one embodiment, the protrusions have a generally triangular shape or a substantially shark-fin-like shape and are generally transverse relative to the second axis.

Alternatively, the protrusions have a generally rectangular shape and are generally parallel relative to the second axis.

In one embodiment, the feeding and collecting means continuously feed and collect the waste material into and from the inner chamber, respectively.

In one embodiment, the first end wall defines a first opening extending therethrough, the feeding means including a feeding mechanism connectable to the first end wall and extending generally through the first opening for feeding the container with the waste material.

Typically, the feeding means includes a feeder wall connectable to the first end wall and substantially closing the first opening, the feeding mechanism mounting on the feeder wall and extending therethrough.

Typically, the feeding mechanism includes a feed compartment for receiving waste material therein and a feed conveyor connected thereto, the feeding conveyor being in fluid communication with both the feed compartment and the inner chamber for conveying the waste material from the feed compartment to the container. Typically, the feed conveyor is a feed screw.

In one embodiment, the second end wall defines a second opening extending therethrough, the collecting means including a collecting mechanism connectable to the second end wall and extending generally through the second opening for collecting the processed waste material from the container.

Typically, the collecting means includes a collector wall connectable to the second end wall and substantially closing the second opening, the collecting mechanism mounting on the collector wall and extending therethrough.

Typically, the agitator is rotatably mounted on both the feeder wall and the collector wall.

Typically, the collecting mechanism includes a receptacle compartment located inside the inner chamber for selectively collecting the processed waste material therefrom and a collector chute connected thereto, the collector chute extending through the collector wall for transferring the collected processed waste material from the receptacle compartment out of the container.

According to a second aspect of the present invention, there is provided a continuous composter for continuously processing organic waste material, the waste material being processed from a generally heterogeneous state into a generally homogenous state, the composter comprising: a support frame; a container defining a container longitudinal axis, a sidewall and generally opposed first and second longitudinal end walls, the container defining an inner chamber, the container rotatably mounting on the support frame about the container axis for circulating the heterogeneous waste material within the inner chamber; an agitator defining an agitator outer surface and an agitator longitudinal axis, the agitator axis being generally parallel to and in a spaced apart relationship relative to the container axis, the agitator being positioned, configured and sized to define a generally unobstructed portion of the inner chamber extending longitudinally therein adjacent the agitator, the agitator rotatably mounting on the frame about the agitator axis for selectively and projectingly homogenizing the circulated heterogeneous waste material from the container into the chamber unobstructed portion; feeding means extending through to the first end wall for continuously feeding the heterogeneous waste material into the inner chamber; collecting means extending through the second end wall for continuously collecting the processed homogenous waste material from the chamber.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
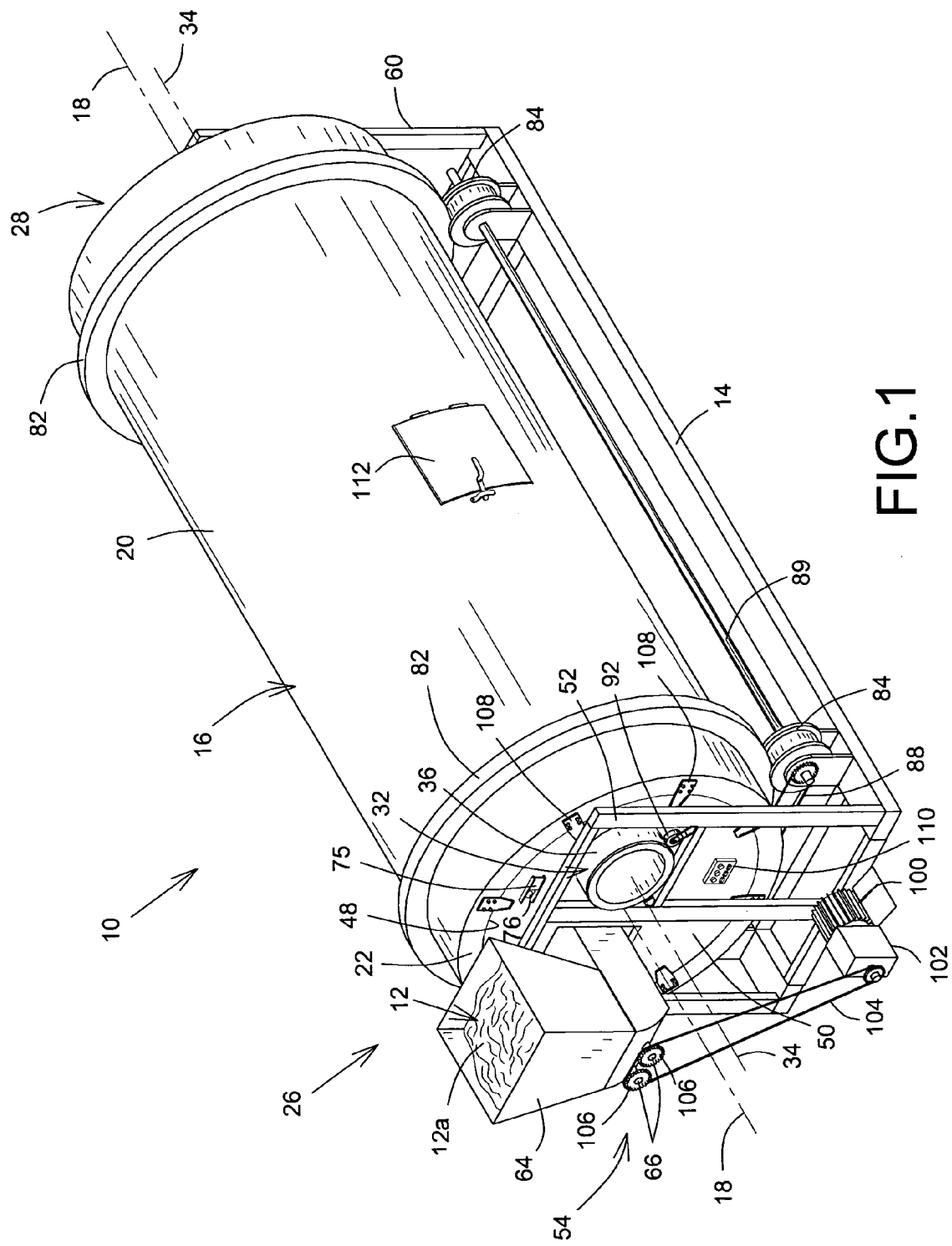
FIG. 1 is a top perspective view of an embodiment of a continuous composter in accordance with the present invention, showing the in-feed end thereof.
Figure 2:
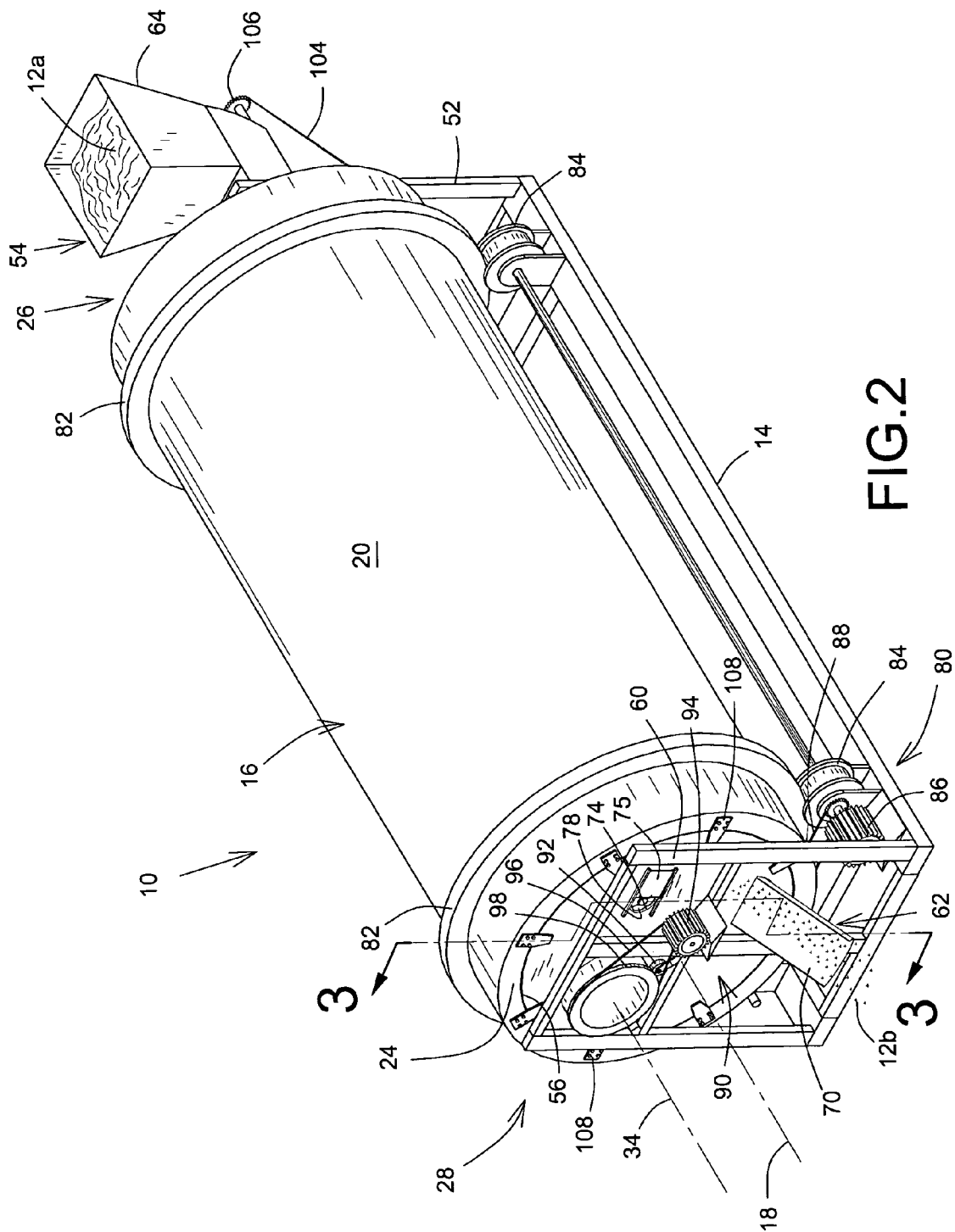
FIG. 2 is a top perspective view of the embodiment of FIG. 1, showing the discharge end thereof.

Referring to FIG. 1, there is schematically shown an embodiment of a continuous composter 10 in accordance with the present invention for continuously and biologically processing organic waste material 12 or the like that is processed from a generally heterogeneous state 12a into a generally homogenous state 12b.

As used herein, the term "heterogeneous state" 12a is intended to mean at least a large proportion of either raw-like or pre-processed waste material which includes any mixture of liquid, solid and paste-like constituents which generally tend to remain as a whole and could eventually be separated in relatively large pieces.

As used herein, the term "homogenous state" 12b is intended to mean a processed waste material which is a mixture of relatively small pieces that generally tend to be uniform in size, weight and texture. The final aspect of the homogenous waste material will vary depending of the type of waste material being processed and the type of required processed waste material.

The composter 10 includes a structural support frame 14 for supporting all the components thereon. The composter 10 also includes a typically elongated container or shell 16 that defines a container axis 18. The container 16 is rotatably supported by the frame 14 about the container axis 18 for its rotational movement during the processing of the amount of waste material 12 located therein. The container 16 has a sidewall 20 and generally opposed first and second end walls 22, 24. The first and second end walls 22, 24 are typically located on the in-feed and discharge ends 26, 28 of the composter 10, respectively. The sidewall 18 and both first and second end walls 22, 24 define an inner chamber 30 there between that has located therein an amount of the heterogeneous waste material 12a for its circulation, as indicated by dark arrows within the inner chamber 30 in FIG. 3.

Although the Figures show that the container 16 has a generally cylindrical shape with a generally circular cross-section, it is contemplated that any shape could be used without departing from the scope of the present invention. Accordingly, the cross-section could have any polygonal shape, and the overall shape of the container 16 could also be slightly conical with the sidewall flaring outwardly in an axial direction toward the second end wall 24, in order to help the waste material 12 located therein to circulate from the first end wall 22 toward the second end wall 24.

Although the container axis 18 and the container 16 are preferably horizontally oriented, it would be obvious to one skilled in the art that they could be slightly angled relative to the horizontal without departing from the scope of the present invention. Accordingly, the discharge end 28 could be slightly lower than the in-feed end 26 to help the waste material 12 located therein to more easily circulate there between.

The container 16 rotates about its axis 18 at a first rotational speed in order to circulate the waste material 12 therein. The first rotational speed, indicated by the single arrow in FIG. 4, could be adjusted typically between about one-tenth of a revolution per hour (0.1 RPH) and about ten revolutions per hour (10 RPH) depending on the specific needs of the user.

Figure 4:
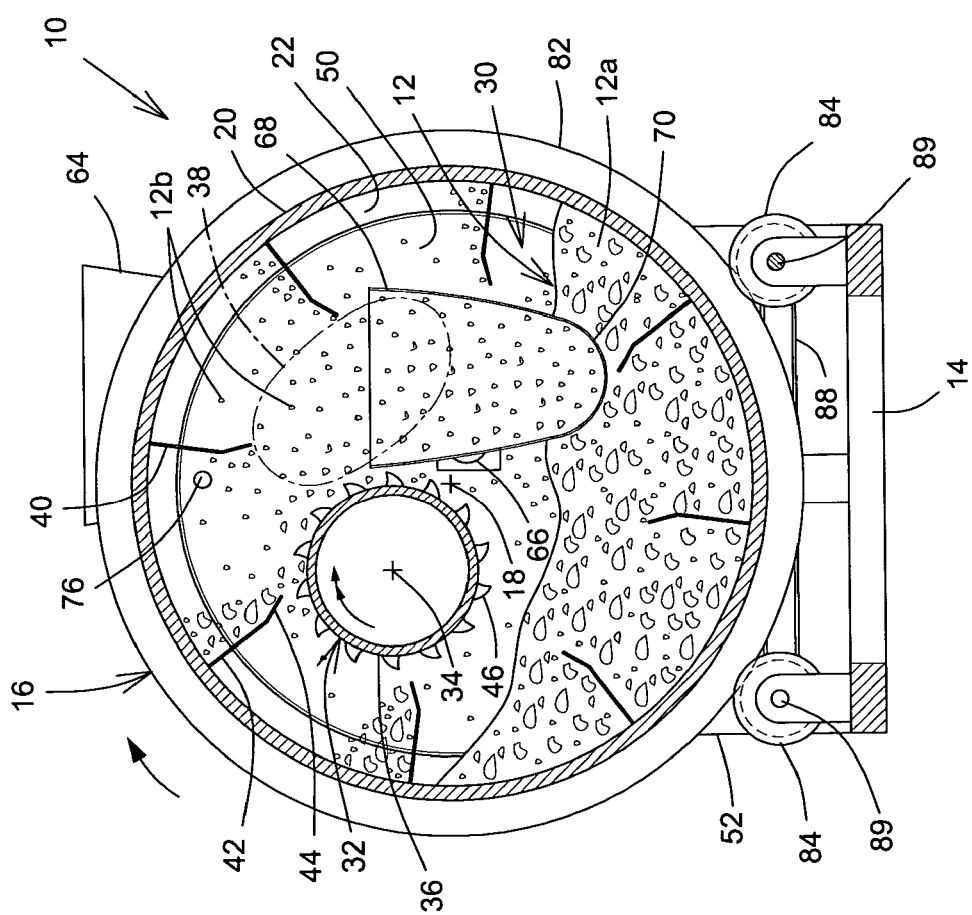
FIG. 4 is an enlarged section view taken along line 4—4 of FIG. 3, showing the circumferential circulation of the waste material inside the container.

The composter 10 also includes an agitator 32, or pulverizer, that defines a second longitudinal axis 34. The agitator 32 rotatably mounts within the inner chamber 30 about the second axis 34 that is substantially parallel to and in a spaced apart relationship relative to the container axis 18, or simply offset relative thereto. The agitator 32 has a generally cylindrical outer peripheral wall 36 (although it could also be slightly conical without departing from the scope of the present invention) that extends generally between the first and second end walls 22, 24 and rotates at a second rotational speed in order to further circulate the waste material 12 inside the inner chamber 30. The second rotational speed, indicated by the double arrow in FIG. 4, could be adjusted typically between about ten revolutions per minute (10 RPM) and about one thousand revolutions per minute (1000 RPM) depending on the specific needs of the user. Typically, the agitator rotational speed is at least two orders of magnitude (100 times) larger than the container rotational speed. As illustrated in FIG. 4, the agitator 32 typically rotates in a common direction with the container 16, each about its respective axis 34, 18 respectively. It would be understood that the above speed figures are provided for indicative purposes.

Figure 3:
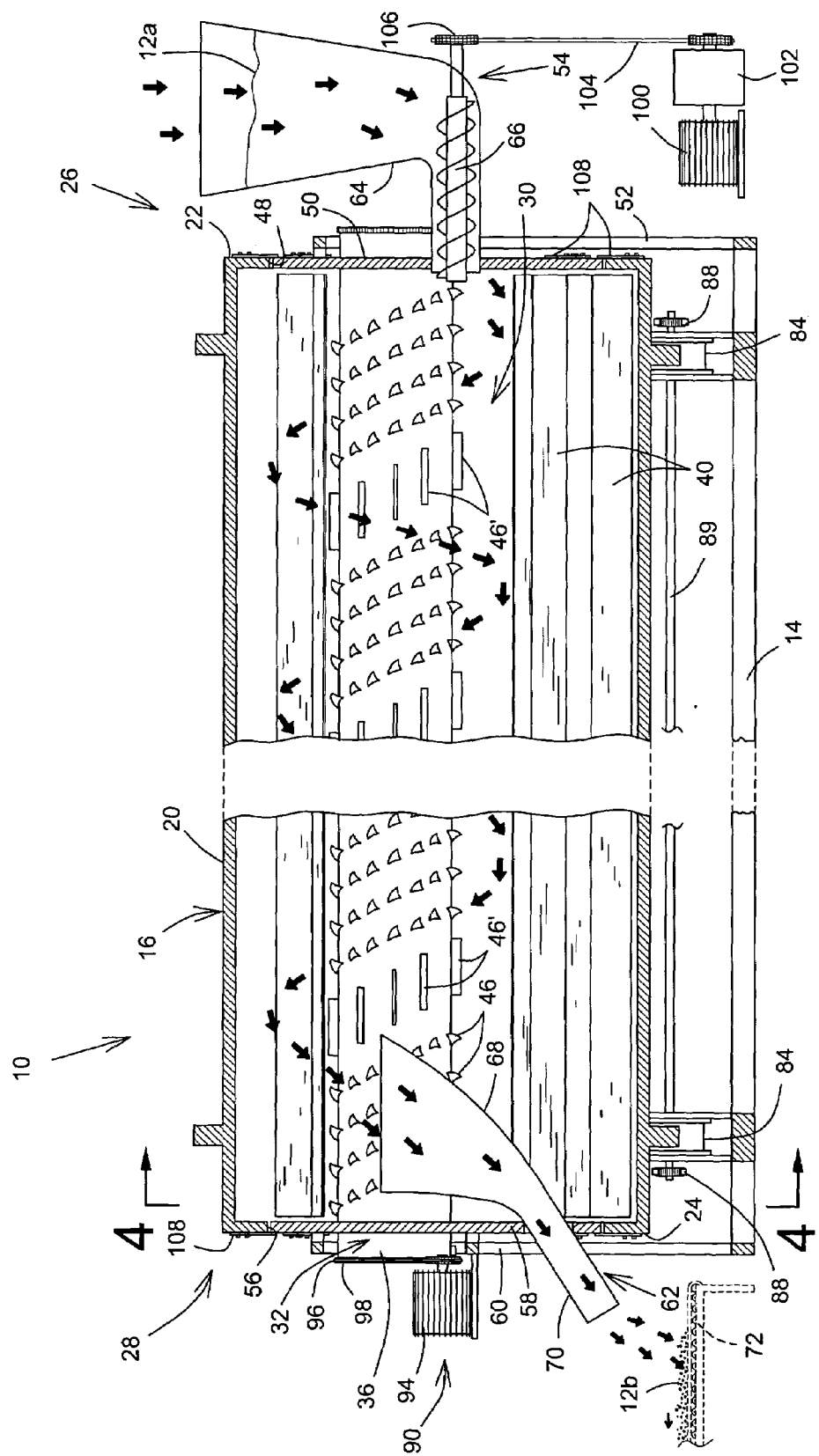
FIG. 3 is a partially broken enlarged section view taken along line 3—3 of FIG. 2, showing the longitudinal circulation of the waste material inside the container, without the waste material for clarity purposes only.

As shown in FIGS. 3 and 4, the agitator 32 is positioned, configured and sized to selectively receive an amount of the circulated waste material 12a from the rotating container 16, to separate the heterogeneous waste material 12a into the homogenous waste material 12b, and to aerate the homogenous waste material 12b with air contained within the inner chamber 30. In other words, the circulated waste material 12a is typically slowly circulated by the sidewall 20 until it essentially falls under gravity onto the outer peripheral wall 36 of the agitator 32. When the heterogeneous waste material 12a hits the outer peripheral wall 36, the latter essentially projects, pulverizes and reduces the waste material 12a into finer particulates that constitutes a more homogenous waste material 12b. This reduction in size or pulverization helps for leveling or making more uniform across the inner chamber 30 the humidity and the temperature levels of the waste material 12 being processed as well as enhances the continuous and regular aeration process of the waste material 12.

The agitator 32 is positioned to define a generally unobstructed portion 38 of the inner chamber 30 that extends longitudinally therein adjacent the agitator 32, as shown in dashed lines in FIG. 4. The agitator 32, with its rotational speed, essentially projects and homogenizes the heterogeneous waste material 12a received from the container sidewall 20 into the unobstructed portion 38 of the inner chamber 30 where it is aerated for better processing. It is to be noted that the agitator 32 is located above the level of heterogeneous waste material 12a in the upper portion of the inner chamber 30 such that it takes relatively a low power drive mechanism to rotate the agitator 32. In general, the agitator 32 does not dip into the heterogeneous waste material 12a located at the bottom of the inner chamber 30.

The container 16 includes longitudinal ribs 40 that extend inwardly and typically substantially radially from the sidewall 20. Typically, the ribs 40 are generally equally circumferentially spaced apart from one another about the first axis 18. Each rib 40 is generally radially shaped to form a scoop to circulate the heterogeneous waste material 12a therein. Each scoop includes a first segment 42 that extends generally radially from the sidewall 20. A second segment 44 extends inwardly and generally angularly, at about fifteen (15) degrees, from the first segment 42 relative to the radial direction of the container 16 such that the scoop efficiently circulates the heterogeneous waste material 12a to drop it onto the outer peripheral wall 36 of the agitator 32.

Figure 5:
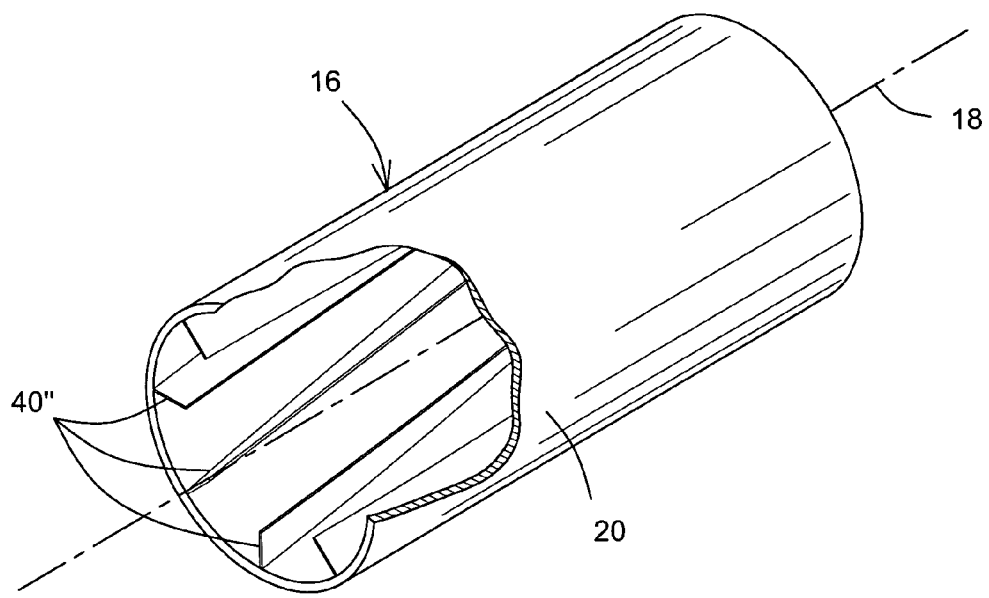
FIG. 5 is a partially broken perspective view, showing helically oriented internal ribs inside the container.
Figure 6:
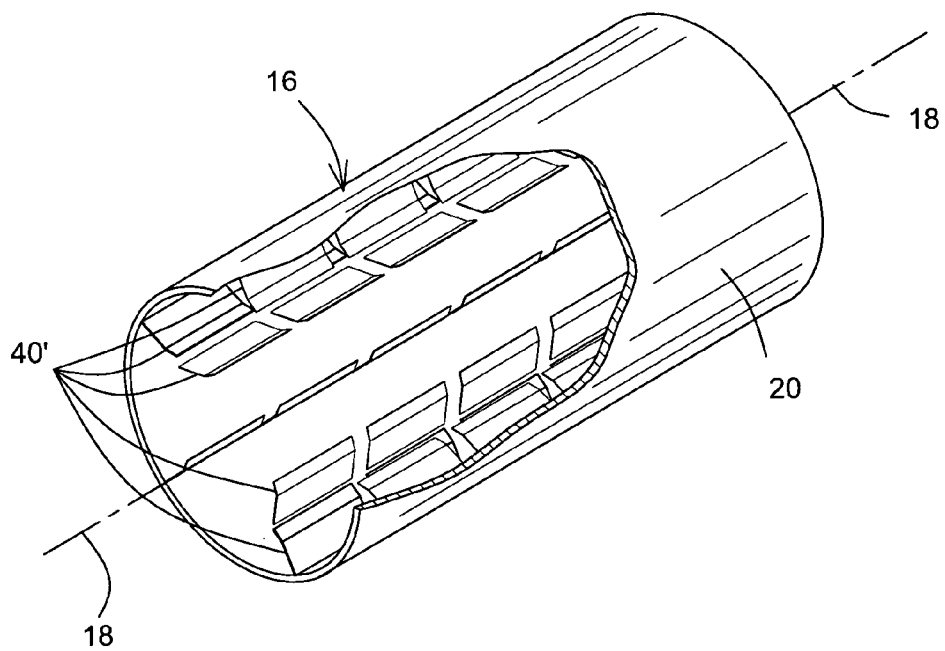
FIG. 6 is a is a partially broken perspective view, showing helically internal ribs extending axially along selected longitudinal portions of the sidewall inside the container.

As shown in FIGS. 3 and 4, the ribs 40 extend generally axially between the first and second end walls 22, 24. Nonetheless, it would be obvious to one skilled in the art that the ribs 40 could have different shapes without departing from the scope of the present invention. Accordingly, the ribs 40' could selectively extend generally axially along a longitudinal portion of the sidewall 20, as illustrated in FIG. 6. Alternatively as shown in FIG. 5, the ribs 40" could extend generally helically between the first and second end walls 22, 24 about the first axis 18 to improve the circulation of the waste material 12a from the first end wall 22 toward the second end wall 24, depending on the processing parameter requirements. Obviously, other than circulating the heterogeneous waste material 12a, the ribs 40 further provide some structural rigidity to the container sidewall 20.

As shown more specifically in FIG. 4, the agitator 32 is located adjacent the ribs 40 to successively receive an amount of the circulated heterogeneous waste material 12a therefrom and to separate said waste material 12a into the homogenous waste material 12b.

To help the homogenization of the waste material 12, the agitator 32 typically includes protrusions 46 that extend outwardly from the outer peripheral wall 36. Typically, the protrusions 46 extend substantially radially from the outer peripheral wall 36 and are generally helically positioned thereon about the second axis 34, as shown in FIG. 3. The pitch of the helical positioning of the protrusions 46 impacts on the efficiency of the protrusions 46 to help in the circulation of the waste material 12 within the inner chamber 30 along the container 16. A smaller pitch increases the circulation of the waste material 12 from the in-feed end 26 to the discharge end 28 of the composter 10, while a larger pitch decreases that circulation effect.

As shown in FIG. 4, the protrusions 46 typically have a generally triangular shape, or more specifically a substantially shark-fin-like shape, that is generally transverse to the agitator axis 34. Other protrusions 46' typically have a generally rectangular shape and are oriented generally parallel to the agitator axis 34. Obviously, the protrusions 46 could have any other shape without departing from the scope of the present invention.

The composter 10 further includes a feeding means connectable, typically via bearings (not shown) or the like, to the support frame 14 adjacent the first end wall 22 for continuously feeding the waste material 12 there through into the inner chamber 30. A collecting means is connectable, also typically via bearings (not shown) or the like, to the support frame 14 adjacent the second end wall 24 for continuously collecting the processed homogenous waste material 12b there through from the inner chamber 30.

The first end wall 22 defines a first opening 48 extending there through. The first opening 48 is typically circular and is centered about the container axis 18. The feeding means includes a feeder wall 50, typically attached to a first vertical extension 52 of the support frame 14, that substantially tightly closes off the first opening 48 while allowing the first end wall 22 to freely rotate there around and the waste material to remain inside the inner chamber 30. The feeding means also includes a feeding mechanism 54 mounted on the feeder wall 50 and extending there through for continuously feeding the container 16 with the heterogeneous waste material 12a while the container 16 rotates.

Similarly, the second end wall 24 defines a second opening 56 extending there through. The second opening 56 is typically circular and is centered about the container axis 18. The collecting means includes a collector wall 58, typically attached to a second vertical extension 60 of the support frame 14, that substantially tightly closes off the second opening 56 while allowing the second end wall 24 to freely rotate there around and the waste material to remain inside the inner chamber 30. The collecting means also includes a collecting mechanism 62 mounted on the collector wall 58 and extending there through for continuously collecting the processed homogenous waste material 12b out from the container 16 while the latter rotates.

Both the feeder and the collector walls 50, 58 rotatably support the agitator 32. Although not specifically illustrated in the Figures, the location of the agitator 32 relative to the container 16 could be optionally adjustable by providing multiple connection apertures into the feeder and collector walls 50, 58 to selectively receive a shaft of the agitator 32, or the agitator itself, there through.

The feeding mechanism 54 includes a feed compartment 64 or hopper for receiving the heterogeneous waste material 12a therein and a feed conveyor 66 connected thereto. The feeding conveyor 66, typically one or two joined feed screws (and cooperating with each other), is in fluid communication with both the feed compartment 64 and the inner chamber 30 for continuously conveying the heterogeneous waste material 12a from the feed compartment 64 to the container 16.

The collecting mechanism 62 includes a receptacle compartment 68 located inside the inner chamber 30 for selectively collecting the processed homogenous waste material 12b therefrom. A collector chute 70 connected to the receptacle compartment 68 extends through the collector wall 58 for transferring by gravity the collected processed waste material 12b from the receptacle compartment 68 out of the container 16. Typically, the collector chute 70 directs the processed waste material 12b onto a discharge conveyor 72 for further handling. Note that a similar in-feed conveyor (not shown) could be considered to continuously feed the feed compartment 64 with waste material 12, without departing from the scope of the present invention.

Furthermore, the composter 10 further includes an air circulation means for allowing air from outside the container 16 to get within the inner chamber 30. The air circulation means includes an air inlet 74 mounted on the container 16, typically to the collector wall 58. The air inlet 74 is at least selectively partially closable by an operator and/or an automated system using a sliding cover 75 or the like. Typically, an air outlet 76, preferably with similar sliding cover 75 and extending through the feeder wall 50, allows air within the inner chamber 30 to flow out therefrom. Whenever required, the air circulation means includes a blower mechanism, or fan 78, to selectively blow air through the air inlet 74 into the inner chamber 30.

Although the collector chute 70 could be considered as an air inlet, it is generally provided the specific air inlet 74 that is generally free from any obstruction by the waste material 12.

Obviously, the sidewall 20, the first and second end walls 22, 24, and the feeder and collector walls 50, 58 could be generally insulated to thermally isolate the inner chamber 30 from the outside environment. This thermal insulation would prove efficient to maintain a specific internal temperature and humidity levels of the waste material inside the container 16 as uniform as possible irrespective of the outside environmental conditions, the latter being hot, cold, humid, dry, etc.

The composter 10 includes a container drive mechanism 80 that typically includes traction bands 82 extending around the outer circumference of container 16. As seen in FIGS. 1 to 4, the support frame 14 supports pairs of transversely spaced drive rollers 84 engaged with a respective traction band 82 to effect the rotation of the container 16 relative to the support frame 14. The container drive mechanism 80 further includes a typically variable speed motor 86, preferably electrical, although other primary drive members, such as a hydraulic motor or the like, could be used. The output shaft from motor 86 is operatively coupled to a reduction gear box (not shown) and a pair of chain drives 88 connected to a pair of drive shafts 89 that support the drive rollers 84.

Similarly, the agitator 32 is driven by an agitator drive mechanism 90 that typically includes a pair of transversely spaced support rollers 92 supportingly engaging a respective longitudinal end of the outer peripheral wall 36 and freely rotatably mounted on a respective of the feeder and collector walls 50, 58. The agitator drive mechanism 90 further includes a typically variable speed motor 94, preferably electrical, although other primary drive members, such as a hydraulic motor or the like, could be used. The output shaft from motor 94 is operatively coupled to a reduction gear box (not shown) and a chain drive 96 connected to a gear 98 mounted on a corresponding end of the agitator 32.

The feeding mechanism 54 further includes a typically variable speed motor 100, preferably electrical, although other primary drive members, such as a hydraulic motor or the like, could be used. The output shaft from motor 100 is operatively coupled to a reduction gear box 102 and a chain drive 104 connected to gears 106 mounted on corresponding end of the feed screws 66 to actuate the latter, the speed depending on the required waste material flow rate for the processing. Alternatively, since the feed screws 66 operate at a relatively low speed, they could ultimately be continuously driven by the motor 86 of the container driving mechanism 80.

All gap interfaces between rotating and fixed components of the composter 10 could be typically at least partially sealed off depending on the location. The components are typically maintained spaced apart relative to each other using low-friction type material such as Teflon™, brass or the like that are self-lubricated by the humidity inside the container 16, such as the container axially retaining plates 108 mounted on both first and second end walls 22, 24.

All driving mechanisms 54, 80, 90, as well as any required measurement instrumentation (not shown), are typically connected to a control box 110 mounted on the support frame 14.

In order to provide access to the inner chamber 30 for cleaning and/or maintenance, the container sidewall 20 is preferably provided with an access opening closable by a corresponding door 112.

Although not shown, a conveying system could be installed to feed a portion of the processed waste material 12b collected at the discharge end 28 of the composter 10 back into the container 16 at the in-feed end 26 for mixing with the unprocessed waste material 12 in order to improve and facilitate the processing thereof.

Although the present continuous composter has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A continuous composter for continuously processing organic waste material, the waste material being processed from a generally heterogeneous state into a generally homogenous state, said composter comprising:
    a support frame;
    a container defining a first longitudinal axis and having a sidewall, said container rotatably mounting on said support frame about said first axis, said sidewall defining an inner chamber having located therein an amount of the heterogeneous waste material for circulation thereof, said container including longitudinal ribs extending inwardly from said sidewall;
    an agitator defining a second longitudinal axis thereof, said agitator rotatably mounting within said inner chamber about said second axis, said second axis being substantially parallel to and in a spaced apart relationship relative to said first axis;
    said agitator being located to selectively receive an amount of the circulated waste material from said rotating container, to separate said heterogeneous waste material into the homogenous waste material, and to aerate the homogenous waste material with air contained within said inner chamber.

2. The composter of claim 1, wherein said container and said agitator rotate with first and second rotational speeds respectively, said second rotational speed being larger than said first rotational speed.

3. The composter of claim 2, wherein said second rotational speed is at least two orders of magnitude larger than said first rotational speed.

4. The composter of claim 1, wherein said ribs extend substantially radially from said sidewall.

5. The composter of claim 4, wherein each of said ribs is generally radially shaped so as to form a scoop to circulate the heterogeneous waste material therein.

6. The composter of claim 5, wherein said scoop includes a first segment extending generally radially from said sidewall and a second segment extending inwardly and generally angularly from said first segment relative to a radial direction.

7. The composter of claim 1, wherein said container has generally opposed first and second longitudinal end walls, said ribs extending generally between said first and second end walls.

8. The composter of claim 7, wherein said ribs extend generally helically between said first and second end walls about said first axis.

9. The composter of claim 7, wherein said ribs extend generally axially between said first and second end walls.

10. The composter of claim 9, wherein each of said ribs selectively extends generally axially along a longitudinal portion of said sidewall.

11. The composter of claim 1, wherein said container is generally cylindrical in shape.

12. The composter of claim 1, wherein said agitator is located adjacent said ribs to successively receive an amount of said circulated waste material therefrom and to separate said waste material into the homogenous waste material.

13. The composter of claim 1, wherein said container and said agitator are commonly rotatable relative to each other about said first and second axes respectively.

14. The composter of claim 1, wherein said ribs are generally equally circumferentially spaced apart from one another about said first axis.

15. The composter of claim 1, further including an air circulation means for allowing air to get within said inner chamber.

16. The composter of claim 15, wherein said air circulation means includes an air inlet connectable to said container, said air inlet being selectively partially closable by an operator.

17. The composter of claim 16, wherein said air circulation means includes a blower mechanism to selectively blow air through said air inlet into said inner chamber.

18. The composter of claim 17, wherein said container has generally opposed first and second longitudinal end walls with the waste material circulating within said inner chamber from said first end wall to said second end wall, said air inlet being located adjacent said second end wall, said air circulation means including an air outlet for allowing air within said inner chamber to flow out therefrom, said air outlet being connectable to said container adjacent said first end wall.

19. The composter of claim 1, wherein said container has generally opposed first and second longitudinal end walls, said agitator extending generally between said first and second end walls.

20. The composter of claim 19, wherein said agitator is substantially cylindrical in shape.

21. The composter of claim 20, wherein said agitator has an outer peripheral wall for selectively receiving an amount of said circulated waste material from said rotating container and separating said waste material into the homogenous waste material.

22. The composter of claim 21, wherein said agitator includes protrusions extending outwardly from said outer peripheral wall.

23. The composter of claim 22, wherein said protrusions extend substantially radially from said outer peripheral wall.

24. The composter of claim 23, wherein said protrusions are generally helically positioned on said peripheral wall about said second axis.

25. The composter of claim 24, wherein said protrusions have a generally triangular shape.

26. The composter of claim 24, wherein said protrusions have a substantially shark-fin-like shape and are generally transverse relative to said second axis.

27. The composter of claim 24, wherein said protrusions have a generally rectagular shape and are generally parallel relative to said second axis.

28. The composter of claim 1, wherein said container has generally opposed first and second longitudinal end walls, said composter further including:
feeding means connectable to said first end wall for feeding the waste material therethrough into said inner chamber;
collecting means connectable to said second end wall for collecting the processed waste material therethrough from said inner chamber.

29. The composter of claim 28, wherein said feeding and collecting means continuously feed and collect said waste material into to and from said inner chamber, respectively.

30. The composter of claim 29, wherein said feeding and collecting means are mounted on said frame.

31. The composter of claim 30, wherein said container and said agitator circulate the waste material within said inner chamber from said first end wall to second end wall.

32. The composter of claim 31, wherein said first end wall defines a first opening extending therethrough, said feeding means including a feeding mechanism connectable to said first end wall and extending generally through said first opening for feeding said container with the waste material.

33. The composter of claim 32, wherein said feeding means includes a feeder wall connectable to said first end wall and substantially closing said first opening, said feeding mechanism mounting on said feeder wall and extending therethrough.

34. The composter of claim 33, wherein said feeding mechanism includes a feed compartment for receiving waste material therein and a feed conveyor connected thereto, said feeding conveyor being in fluid communication with both said feed compartment and said inner chamber for conveying the waste material from said feed compartment to said container.

35. The composter of claim 34, wherein said feed conveyor is a feed screw.

36. The composter of claim 33, wherein said second end wall defines a second opening extending therethrough, said collecting means including a collecting mechanism connectable to said second end wall and extending generally through said second opening for collecting the processed waste material from said container.

37. The composter of claim 36, wherein said collecting means includes a collector wall connectable to said second end wall and substantially closing said second opening, said collecting mechanism mounting on said collector wall and extending therethrough.

38. The composter of claim 37, wherein said agitator is rotatably mounted on both said feeder wall and said collector wall.

39. The composter of claim 37, wherein said collecting mechanism includes a receptacle compartment located inside said inner chamber for selectively collecting the processed waste material therefrom and a collector chute connected thereto, said collector chute extending through said collector wall for transferring the collected processed waste material from said receptacle compartment out of said container.

40. The composter of claim 1, wherein said sidewall is generally insulated to thermally isolate said inner chamber from the outside.

41. The composter of claim 40, wherein said container has generally opposed first and second longitudinal end walls, said first and second end walls being generally insulated to thermally isolate said inner chamber from the outside.

42. The composter of claim 1, wherein said container defines generally opposed longitudinal container ends thereof, said composter further including generally opposed feeder and collector walls secured to said support frame adjacent a respective of said container ends, said feeder and collector walls rotatably supporting said agitator.

43. The composter of claim 42, further including:
feeding means connectable to said feeder wall for continuously feeding the waste material therethrough into said inner chamber;
collecting means connectable to said collector wall for continuously collecting the processed waste material therethrough from said inner chamber.

44. A continuous composter for continuously processing organic waste material, the waste material being processed from a generally heterogeneous state into a generally homogenous state, said composter comprising:
a support frame;
a container defining a container longitudinal axis, a sidewall wall and generally opposed first and second longitudinal end walls, said container defining an inner chamber, said container rotatably mounting on said support frame about said container axis for circulating the heterogeneous waste material within said inner chamber;
an agitator defining an agitator outer surface and an agitator longitudinal axis, said agitator axis being generally parallel to and in a spaced apart relationship relative to said container axis, said agitator being positioned, configured and sized to define a generally unobstructed portion of said inner chamber extending longitudinally therein adjacent said agitator, said agitator rotatably mounting on said frame about said agitator axis for selectively and projectingly homogenizing the circulated heterogeneous waste material from the container into said chamber unobstructed portion;
feeding means extending through to said first end wall for continuously feeding the heterogeneous waste material into said inner chamber;
collecting means extending through said second end wall for continuously collecting the processed homogenous waste material from said chamber.

45. The composter of claim 44, further including generally opposed feeder and collector walls secured to said support frame adjacent said first and second container end walls, respectively, said feeder and collector walls extending generally through said first and second end walls, respectively, and rotatably supporting said agitator.

* * * * *